(12) United States Patent
Dantus (10) Patent No.: US 11,385,098 B2
(45) Date of Patent: Jul. 12, 2022

(54) METHOD AND SYSTEM FOR CHARACTERIZING POWER IN A HIGH-POWER LASER

(71) Applicant: Board of Trustees of Michigan State University, East Lansing, MI (US)

(72) Inventor: Marcos Dantus, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 17/154,461

(22) Filed: Jan. 21, 2021

(65) Prior Publication Data
US 2021/0239523 A1     Aug. 5, 2021

Related U.S. Application Data

(60) Provisional application No. 62/989,611, filed on Mar. 14, 2020, provisional application No. 62/968,245, filed on Jan. 31, 2020.

(51) Int. Cl.
*G01J 1/42* (2006.01)
*H01S 3/11* (2006.01)
(Continued)

(52) U.S. Cl.
CPC ............. *G01J 1/4257* (2013.01); *H01S 3/11* (2013.01); *G01J 2001/4247* (2013.01);
(Continued)

(58) Field of Classification Search
CPC .... G01J 1/42; G01J 1/4257; G01J 2001/4238; G01J 2001/4247; G01J 2001/4295;
(Continued)

(56) References Cited

U.S. PATENT DOCUMENTS 6,483,327 B1 * 11/2002 Bruce .................... G01R 1/071
324/537
6,608,494 B1 *  8/2003 Bruce .................. G01R 31/303
324/537
(Continued)

FOREIGN PATENT DOCUMENTS

WO    WO 2020/047279 A1    3/2020

OTHER PUBLICATIONS

Smirnov, S.V., et al., "Mode-Locked Fibre Lasers with High-Energy Pulses," InTech (Dec. 2011).
(Continued)

*Primary Examiner* — John R Lee
(74) *Attorney, Agent, or Firm* — Harness, Dickey & Pierce, P.L.C.

(57) ABSTRACT

A system for determining a characteristic of a laser includes a collection housing receiving a laser beam comprising a first pulse, a second pulse and a time period between the first pulse and the second pulse. A photon counting detector receives photons from the laser beam disposed to generate photon signals from the laser beam and generating a start signal. A fast diode generates a stop signal to provide a time reference of counted photons ns. A controller is coupled to the photon counting detector and the fast diode. The controller counts photons from the photon counting detector occurring during the time period between the first and second pulse and generates a first output signal corresponding to a power during the time period between the first pulse and the second pulse.

35 Claims, 12 Drawing Sheets

(51) Int. Cl.
   *H01S 3/23* (2006.01)
   *H01S 3/067* (2006.01)
   *H01S 3/16* (2006.01)

(52) U.S. Cl.
   CPC ......... *H01S 3/06716* (2013.01); *H01S 3/1618* (2013.01); *H01S 3/2308* (2013.01)

(58) Field of Classification Search
   CPC ........ G01J 2001/4413; G01J 2001/442; H01S 3/11; H01S 3/06716; H01S 3/1618; H01S 3/2308
   See application file for complete search history.

(56) References Cited

U.S. PATENT DOCUMENTS

| | | |
|---|---|---|
| 7,439,497 B2 | 10/2008 | Dantus et al. |
| 7,450,618 B2 | 11/2008 | Dantus et al. |
| 7,567,596 B2 | 7/2009 | Dantus et al. |
| 7,583,710 B2 | 9/2009 | Dantus et al. |
| 7,609,731 B2 | 10/2009 | Dantus et al. |
| 7,973,936 B2 | 7/2011 | Dantus |
| 8,208,504 B2 | 6/2012 | Dantus et al. |
| 8,208,505 B2 | 6/2012 | Dantus et al. |
| 8,265,110 B2 | 9/2012 | Dantus et al. |
| 8,300,669 B2 | 10/2012 | Dantus et al. |
| 8,311,069 B2 | 11/2012 | Dantus et al. |
| 8,618,470 B2 | 12/2013 | Dantus et al. |
| 8,630,322 B2 | 1/2014 | Dantus et al. |
| 8,633,437 B2 | 1/2014 | Dantus et al. |
| 8,675,699 B2 | 3/2014 | Dantus et al. |
| 8,861,075 B2 | 10/2014 | Dantus et al. |
| 9,018,562 B2 | 4/2015 | Dantus |
| 9,048,632 B1 | 6/2015 | Dantus et al. |
| 9,202,678 B2 | 12/2015 | Dantus et al. |
| 10,130,511 B2 | 11/2018 | Dantus |
| 10,267,739 B2 | 4/2019 | Dantus et al. |
| 10,598,682 B2 | 3/2020 | Dantus et al. |
| 10,971,881 B2 | 4/2021 | Dantus et al. |
| 2009/0207869 A1 | 8/2009 | Dantus et al. |
| 2009/0216299 A1 | 8/2009 | Dantus |
| 2009/0256071 A1 | 10/2009 | Dantus et al. |
| 2013/0092846 A1* | 4/2013 | Henning ............ G01N 21/6408 250/458.1 |
| 2014/0191114 A1* | 7/2014 | Russo ....................... G01J 1/44 250/208.2 |
| 2014/0233942 A1* | 8/2014 | Kanter .................... G01S 17/26 398/25 |
| 2015/0157209 A1 | 6/2015 | Dantus |
| 2019/0250257 A1* | 8/2019 | Finkelstein ............ H04N 5/335 |
| 2020/0212643 A1 | 7/2020 | Dantus et al. |
| 2020/0370955 A1* | 11/2020 | Hennecke ............. G01S 7/4816 |
| 2021/0239523 A1* | 8/2021 | Dantus .................. G01J 1/0425 |

OTHER PUBLICATIONS

Schwartz, O., et al., "Shot noise limited characterization of ultraweak femtosecond pulse trains," Optical Society of America (2011), (Jan. 2011).

Sequoia$^{HD}$: "Ultra high dynamic range" publication (published before Jan. 31, 2020).

* cited by examiner

METHOD AND SYSTEM FOR CHARACTERIZING POWER IN A HIGH-POWER LASER

CROSS-REFERENCE TO RELATED APPLICATION

This application claims priority to U.S. Provisional Application No. 62/968,245, filed on Jan. 31, 2020, and U.S. Provisional Application No. 62/989,611, filed on Mar. 14, 2020. The entire disclosures of the above applications are incorporated herein by reference.

GOVERNMENT FUNDING

This invention was made with government support under CHE1836498 awarded by the National Science Foundation. The government has certain rights in the invention.

BACKGROUND

The present disclosure relates generally to a laser system and, more particularly, to a method and apparatus for measuring the performance of an ultrashort pulse diode pumped laser.

Industrial short pulse lasers are experiencing major growth since the initial use of sub-picosecond (femtosecond) laser pulses for ophthalmology. These lasers differ from those used in scientific experiments because they usually require high power >1 W and already available with up to 1000 W of average power, and high repetition rates from 100 kHz to 100 MHz. These lasers have one more stages of amplification, are typically compact, and are often fiber based. As the number of applications increase and the number of commercial lasers increases, it has been noted that not all lasers with the same reported characteristics perform a desired processing task with the same efficiency and quality. This implies that pulse duration, average power, and repetition rate are not sufficient metrics to characterize an industrial ultrashort pulse laser.

Linear interferometry is one method for characterizing femtosecond laser pulse characterizations. However, linear measurement of the average laser power of a femtosecond laser provides integrated intensity of the train pulses. Such methods include the entire pulse and do not discriminate between portions of the pulses. Discriminating between different parts of the pulses is believed to be useful.

Many nonlinear methods for measuring pulse duration and spectral phases of pulses have been used. However, these methods are nonlinear and confined to a proximity of nanoseconds from the pulse. There does not appear to be a reliable method for measuring the power that resides between pulses in a femtosecond laser.

Because high power lasers pose a tremendous burden on optics, measuring performance of a laser is important. The optics involved in pulse stretching and compression age intend to introduce random phases to the pulse or periods between the pulses. Detecting changes in performance allows the optics to be replaced and therefore better results to be obtained by the system operator.

SUMMARY

In accordance with the present disclosure, a laser pulse diagnostic metrology apparatus is provided. In another aspect, an apparatus and method specifying what fraction of the average power of an industrial ultrashort pulse laser ("IUSPL") is contained between the actual pulses, and measuring such a fraction is employed; this is referred to as a Power Figure of Merit ("PFM"). In a further aspect, the present laser apparatus and method include programmable computer instructions which use a linear method of sampling photons from a series or train of laser pulses and measure and/or diagnose noise or undesirable characteristics between the laser pulses.

The present measurement will allow comparison among the growing number of industrial lasers. During laser manufacturing, the PFM measurement will allow improvements in order to meet the highest standards of quality. During material processing by the laser, the continuous monitoring by the measurement being disclosed will alert quality control of changes in PFM to ensure processing does not suffer. The PFM measurement is the metric that completes IUSPL characterization, when added to pulse duration, repetition rate and average output power.

In one aspect of the disclosure, a system for determining a characteristic of a laser includes a collection housing receiving a laser beam comprising a first pulse, a second pulse and a time period between the first pulse and the second pulse. A photon counting detector receives photons from the laser beam disposed to generate a statistical representation of photon signals from the laser beam. A fast diode generating a stop signal to provide a time reference to the counted photons. A controller is coupled to the photon counting detector and the fast diode. The controller counts photons from the photon counting detector occurring during the time period between the first and second pulse and generates a first output signal corresponding to a power during the time period between the first pulse and the second pulse.

In another aspect of the disclosure, system for determining a characteristic of a laser system includes a collection housing receiving a laser beam comprising a first pulse, a second pulse and a time period between the first pulse and the second pulse. A photon counting detector receives photons from the laser beam disposed to generate a statistical distribution of the photons from the laser beam. A fast diode generates a stop signal to provide a time reference for the counted photons. A controller comprises a time correlated single photon counter counting photons from the photon counting detector occurring during the first pulse to get a first count and the time period between the first pulse and second pulse to get a second count. The controller generates a first output signal corresponding to the first count and the second count indicative of a performance of the laser system.

In another aspect of the disclosure, a method comprises generating a first count of photons at a time period between consecutive laser beam pulses, comparing the first count to a threshold and generating a degradation indicator signal in response to comparing the count.

The present apparatus and method are advantageous in the design and construction of IUSPLs. Furthermore, the present apparatus and method are advantageous to provide metrics for comparing IUSPLs. The present apparatus and method are also beneficial to diagnose installed IUSPLs during operation and the processing quality of systems using IUSPLs.

DRAWINGS

The drawings described herein are for illustrative purposes only of selected examples and not all possible implementations, and are not intended to limit the scope of the present disclosure.

DETAILED DESCRIPTION

Examples will now be described more fully with reference to the accompanying drawings. Although the following description includes several examples of components, it is understood that the features herein may be applied to systems with other components. The examples disclosed below are not intended to be exhaustive or limit the disclosure to the precise forms disclosed in the following detailed description. Rather, the examples are chosen and described so that others skilled in the art may utilize their teachings.

Consider a conventional 100 W laser operating at a repetition rate of 1 MHz. If such a laser had a PFM of 1.0, the ideal, the only other metric required to predict its performance would be the pulse duration. Now, consider the same laser, however, the PFM is 0.8. That value implies that 20 W of power are dispersed between the pulses as an incoherent amount of light that is not part of the pulses. Given that all pulse characterization methods use nonlinear optics, they discriminate for incoherent photons, so they go unmeasured. Moreover, pulse characterization methods are typically designed to measure the pulses within 1 picosecond and up to 1 nanosecond, but none reach the microsecond (s) required to measure the power between pulses of a kHz or even a 100 MHz laser. While 20 W seems to be a large amount of energy that should be easy to measure, it is extremely difficult to measure in real life. This is because the pulse duration is approximately $10^{-13}$ s and the time between pulses is $10^{-6}$ s. Therefore, for every photon within the pulse, there is only $10^{-7}$ photons in the same time window. Such levels would be very challenging to measure with an oscilloscope or a power meter because of their limited dynamic range. The oscilloscope and the detector would need to have greater than 24-bit dynamic range.

There has been no need to measure the PFM of most traditional ultrashort pulse lasers. Oscillators, by design, have extremely high PFM, exceeding 0.999. Amplified sources have lower PFM but their application in the sciences most often involves nonlinear optical measurements, for which the PFM is irrelevant. In some cases, very high contrast ($10^{-8}$-$10^{-14}$) autocorrelation measurements have been performed on high energy pulses (>150 uJ/pulse). These measurements have been designed for low repetition rate (<kHz) high energy pulses (>1 mJ and up to Joules per pulse). For industrial processes, however, PFM of the present apparatus is desirable.

Figure 1:
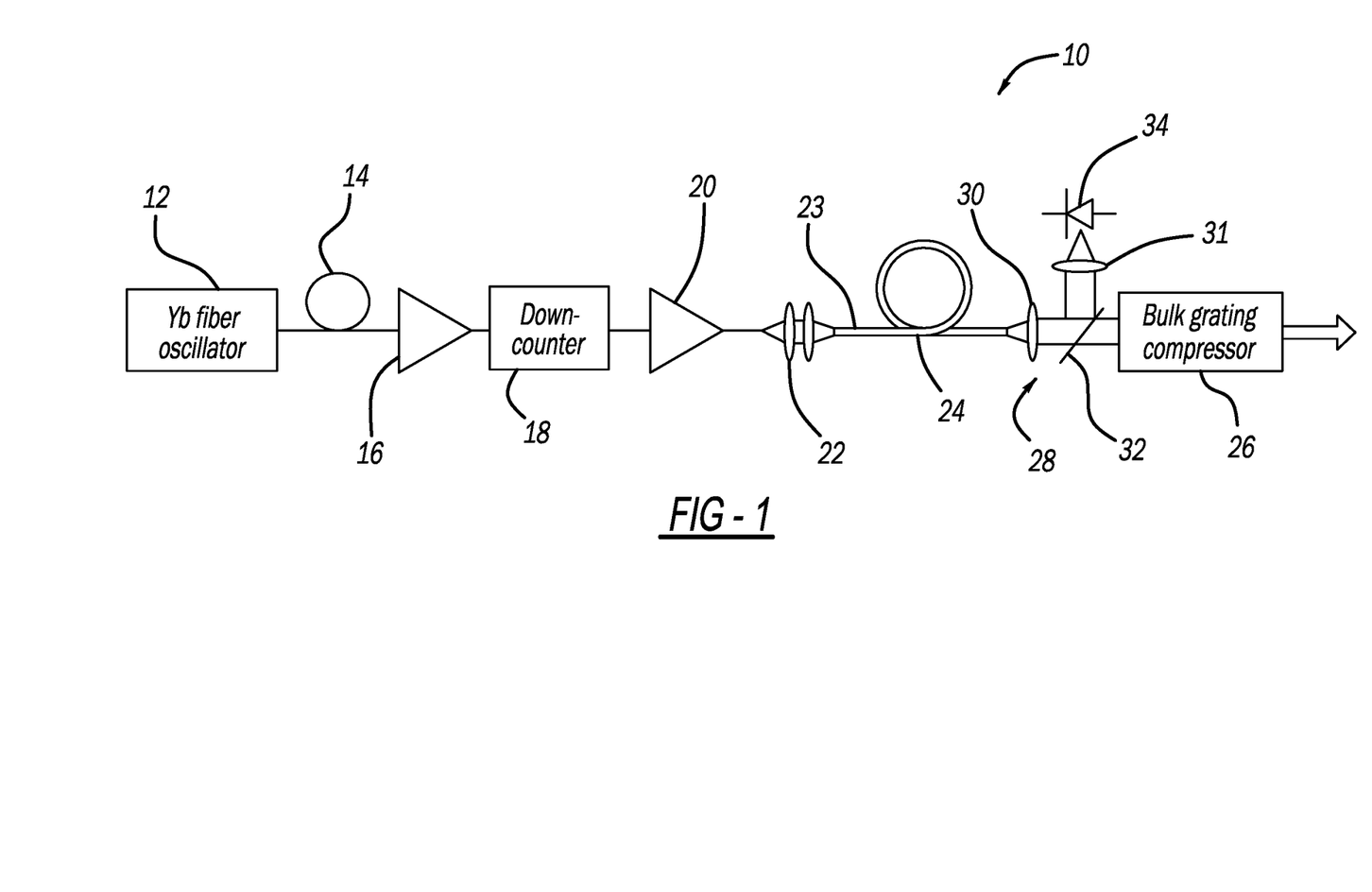
FIG. 1 is a schematic view of a laser.

Referring now to FIG. 1, an example of a fiber laser 10 suitable for the present example is set forth. However, the teachings set forth herein may be used with other laser configurations and types. The fiber laser 10 includes a Yb fiber oscillator 12 coupled to a single mode fiber stretcher 14. The fiber stretcher 14 is coupled to a pre-amplifier 16 and a downconverter 18, which lowers the frequency. A second preamplifier 20 communicates the signal from the downconverter 18 to the optics 22 that couple the laser light into the optical fiber 23. A photonic crystal amplifier (PCF) power amplifier 24 communicate signals to a bulk grating compressor 26 through optics 28. The objects may include lenses 30, 31, a beam splitter 32 and a photodiode 34 which receives light from the lens 31. This configuration is merely one example. Changes in the system may be made depending on various design parameters. For example, the beam splitter or other optical components may be eliminated or upgraded when configured into a high powered laser system.

The laser beam is directed toward a sample or other process area. The laser 10 may be an industrial ultrashort pulse diode pumped laser (iUSPL). The laser 10 may also be referred to as a femtosecond laser. As mentioned above, high power laser, such as 100 or even 1000 watt lasers, are becoming increasingly more important in the industrial world. Stray photons, however, may be traveling through the optical fibers and may be induced from various optical components (or the degradation thereof) within the optical system. Photons are, for the most part, disposed within the optical pulses.

Figure 2A:
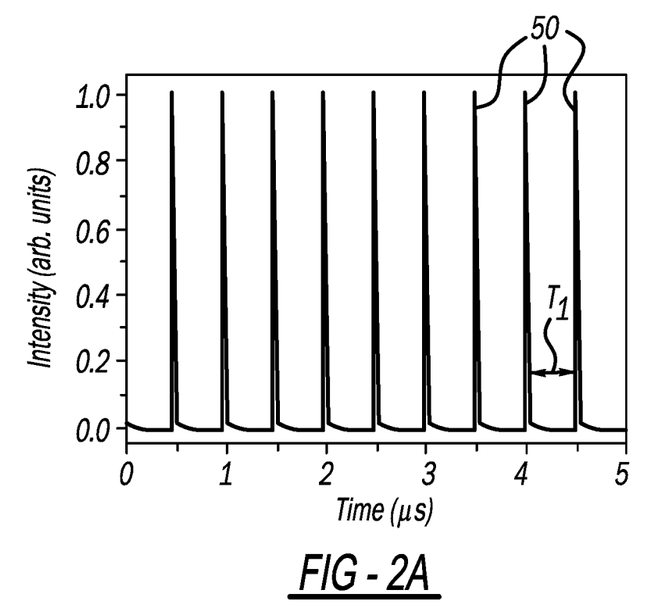
FIG. 2A is a plot of laser pulses for an ultrafast pulse laser.

Referring now to FIG. 2A, a plurality of consecutive optical pulses 50 in a time versus intensity plot are illustrated. The pulses 50 are uniformly spaced. The pulses 50 occur at a regular time period. A time period $T_1$ between each of the pulses may also contain some power associated with the pulses. The power that corresponds to the amount of light or photons within time period $T_1$ is inefficiently used power and is an indicator of a loss of performance. The time period $T_1$ is uniform between successive pulses. The phase of the stray photons is not the same as the photons within the pulse. Stray photons propagate within the fiber and follow collinearly the train of the pulses. The stray pulses contribute to the measured output of the laser due to their collinearity with the train of pulses from the laser.

Figure 2B:
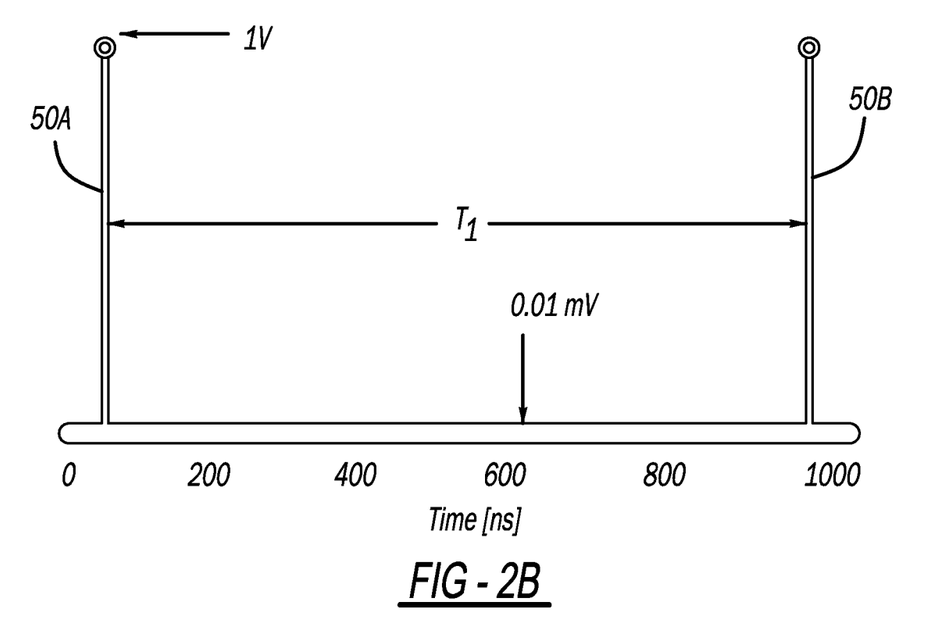
FIG. 2B is an enlarged portion of the pulses of FIG. 2A.

Referring to FIG. 2B, a simulated oscilloscope a trace for a 1 MHz repetition rate 100 watt laser showing a first pulse 50A and a second pulse 50B with the first time period $T_1$ therebetween. The amplitude of the pulses 50A and 50B is illustrated as one volt. The voltage between the optical pulses corresponds to about 0.1 mV in this example. The amount of power within the time period $T_1$ can vary over the life of the equipment. That is, the voltage measured from a photodetector may increase due to the increased number of photons within the time period $T_1$. This is an example of degradation of the performance characteristics of the system.

Prior to the emergence of industrial ultrafast lasers, there was little or no need to measure the energy content between the laser pulses 50A and 50B. As mentioned above, high power lasers have repetition rates that vary considerably and it is believed to be due to the amount of power between the pulses. This amount can change over the course of operation due to degradation of equipment. The amount of power between pulses also changes due to manufacturing variability of the various components. The same models of the same equipment may have differing outputs. The amount of power between the pulses corresponds to the number of stray photons. A Power Figure of Merit (PFM) may be defined as the amount of photons within the pulse, such as 50A or 50B, divided by the number of photons from the start of a pulse to the beginning of the next pulse. The photons correspond to Power and thus the PFM may be stated as the power within a laser pulse divided by the power from the leading edge of a pulse to the leading edge of a subsequent pulse. In FIG. 2B, the Power Figure of Merit (PFM) is about 0.9 implying that only 90% of the power is contained within the pulses and the rest is in the time period T1 between the pulses. As will be set forth below, a method of counting the photons and the time associated with the photons from the start of a pulse to the start of the next pulse provides an indication of the relative power location and thus the PFM of a laser.

Figure 3:
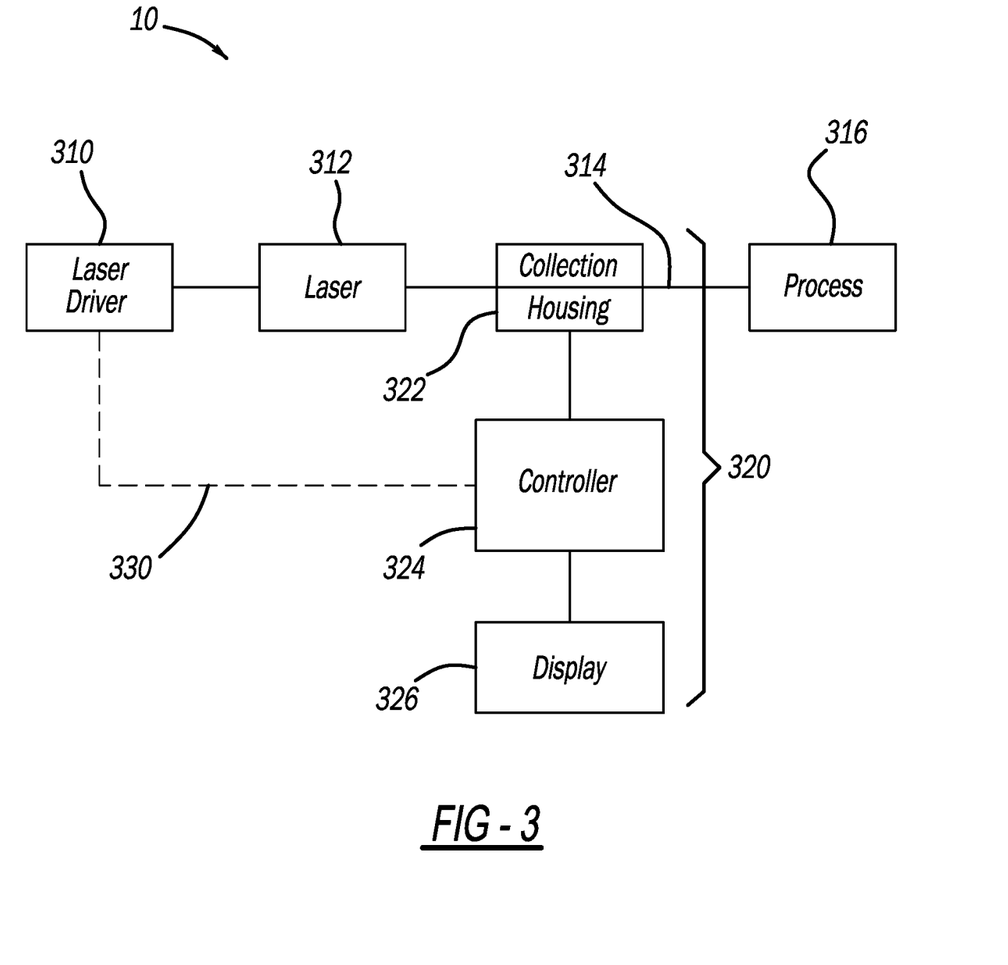
FIG. 3 is a block diagrammatic view of a performance measuring system relative to a laser.

Referring now to FIG. 3, a high level block diagrammatic view of a power/photon measurement unit is set forth. A laser driver 310 is used to drive the laser 312 to form a laser beam 314. The laser beam 314 is directed to a process 316. The process may be one of a number of types of industrial processes, such as, but not limited to, cutting foils for flat panel displays, cutting stents, drilling fuel injector nozzles, scribing wafers for microelectronics and microstructuring surfaces. One example of a fiber laser is illustrated in FIG. 1. A system 320 for determining a characteristic of a laser is set forth. The system 320 has a collection housing 322 that is disposed around the laser beam 314. The collection housing 322 may be integrated into the laser adjacent to the optics or may be a separate unit that is placed so that the laser beam passes therethrough. With high power industrial lasers, the collection housing does not intersect the beam with beam splitters or the like. Details of the collection housing 322 are set forth below.

The collection housing 322 is coupled to a controller 324. The controller 324 is used for determining the power or photons during the time period between a first pulse and a second pulse of the laser beam 314. The controller 324 may be microprocessor-based and programmed to perform a number of steps. The controller 324 will be set forth in further detail below. The controller 324 may be one component or a plurality of components, such as a timer, memory, comparator, a microprocessor and a time-correlated single-photon country system (TCSPC). Other components such as digital signal processing components and circuitry may also be located within the controller 324.

The controller 324 may be used to generate an indicator on a display 326 associated with the controller. The display 326 may include various types of messages that corresponds to a degradation indicator that indicates the number of photons between a first pulse and a second pulse of a laser. The display may, for example, generate a warning message indicating to the system operator that the optics of the laser 312 may need to be changed. The display 326 may generate a numerical display that corresponds to a first output signal from the controller that corresponds to the power period between the first pulse and the second pulse. A graph may also be generated on the display 326 that provides a history of the Power Figure of Merit (PFM) or the number of photons or power between two consecutive laser pulses. The graph, over time may show a decreasing PFM. The display 326 may also provide an audible indication of a change in the number of photons between pulses (change in power).

The controller 324 may also be used for automatic operation of the laser driver 310. That is, a dotted line 330 may allow the controller 324 to shut the laser system 10 when the Power Figure of Merit, the power between pulses or the number of photons counted between pulses is outside of a predetermined window or above or below a threshold.

Figure 4A:
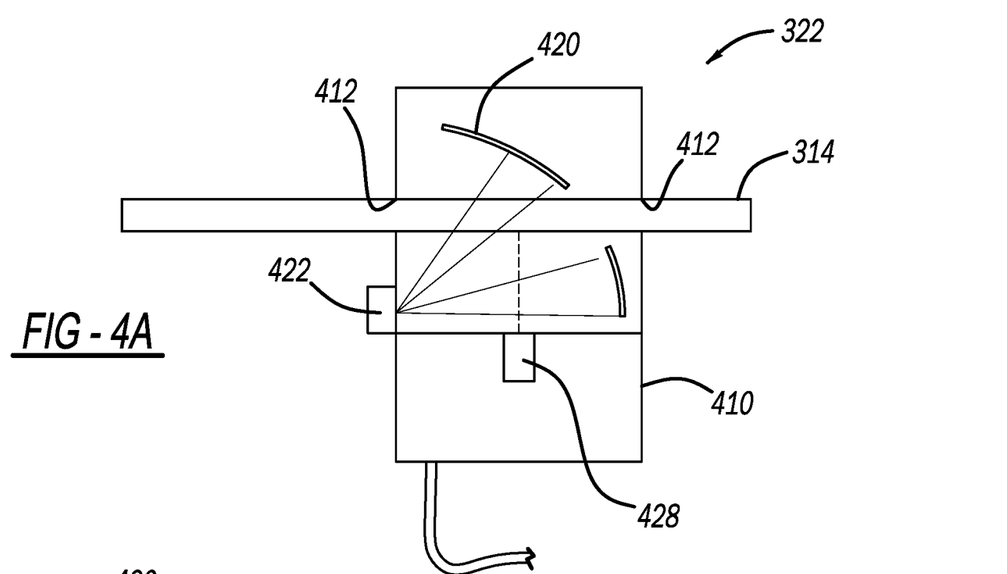
FIG. 4A is a top view of the collection housing of FIG. 3.
Figure 4B:
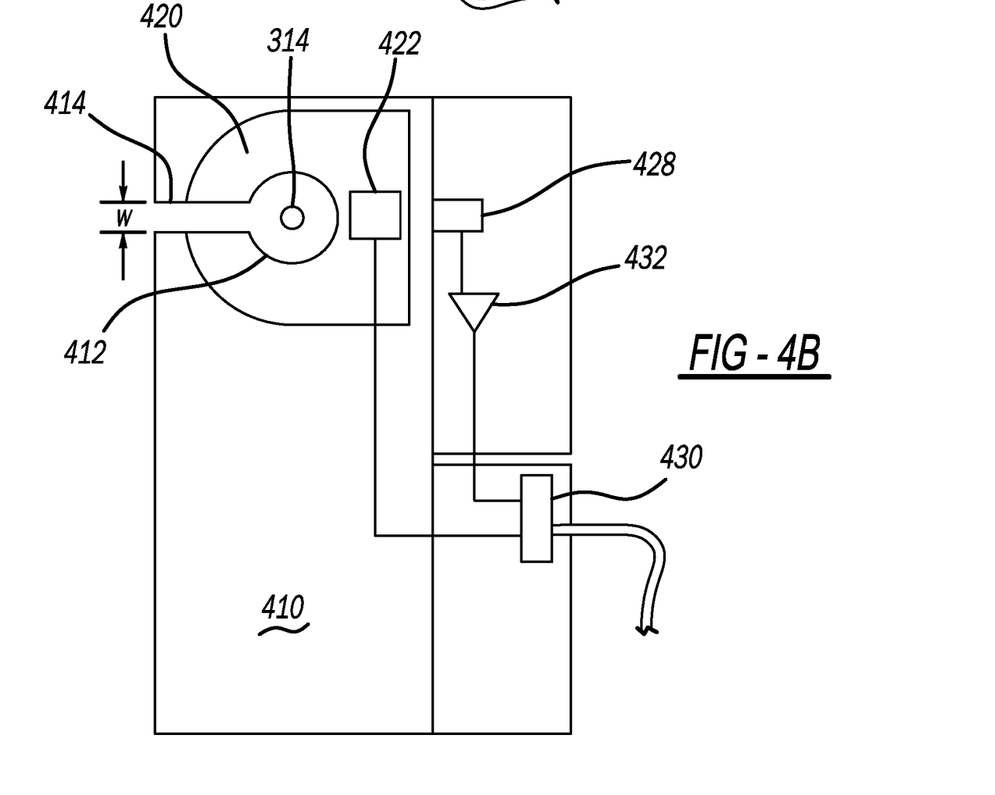
FIG. 4B is a front view of the collection housing.

Referring now to FIGS. 4A and 4B, the collection housing 322 is illustrated in further detail. The collection housing 322 has outer walls 410 that have openings 412 disposed therethrough. The outer walls 410 preferably to do not contact the laser beam as illustrated best in FIG. 4B. The outer walls may include a slot 414 so that the laser beam may not be interrupted if the collection housing 322 is placed over an active laser beam 314 during operation. That is, the width W of the slot 414 is greater than the diameter of the laser beam 314. The collection housing 322 is used for detecting the photons for counting. The collection housing 322 has a mirror 420. The mirror 420 reflects low angle scattered photons emitted from the laser beam to a fast photodiode 422. The fast photodiode 422 may be coupled to an optical fiber, in that case photons from the mirror enter the fiber before reaching the photodiode. The shape of the mirror 420 may be paraboloid and the location of the fast photodiode 422 may be at the focal point of the mirror 420. The mirror is thus off-axis due to the position of the laser and the focal point. Although a parabola in cross-section, the mirror 420 may be a paraboloid or other conic shapes such as an ellipsoid or hyperboloid. The output of the fast photodiode is used for syncing the system as will be described in more detailed below. Synching refers to providing a reference time to the photon counter in terms of starting or stopping of photon counting.

A photon counting detector 428 may also be disposed within the housing 322. The photon counting detector 428 may be an avalanche diode that generates an electrical pulse upon the detection of a photon. The output of photon counting detector 428 may be used for counting a photon for every predetermined number of pulses. For example, in one constructed example, a photon was counted for every approximately 1000 pulses. That is, less than one photon per pulse is counted, this ensures a statistical sampling of the laser pulse train. A high power laser pulse may contain greater than $10^{12}$ photons and easily exceed $10^{15}$ photons. Thus, very high attenuation is required. By sampling the photons over a large number of pulses, a statistically sufficient result may be obtained. The count, as will be described in more detail below, corresponds to time windows or bias between the beginning of the first pulse and the beginning of the second pulse or the beginning of the first pulse and the end of a second pulse over a period of time. A time for each photon count is thus correlated to the position relative to the pulses of the laser beam. Because of the precision of the pulses and the timing thereof, the reference to a pulse and a time between a pulse is really a combination of measurements over a significantly large number of pulses. The output of the signals from the fast photodiode 422 and the photon counting detector 428 may be provided to an interface 430. In particular, the signal from the photon counting detector 428 may be amplified at an amplifier 432 prior to being communicated to the connector 430 for further processing.

The fast photodiode 422 may be made of silicon and may be used to trigger the counting of photons of a time correlated single photon counting system. The fast photodiode may synchronize with the output train of pulses and noninvasively detecting fewer than $10^{10}$ photons per pulse.

Figure 5:
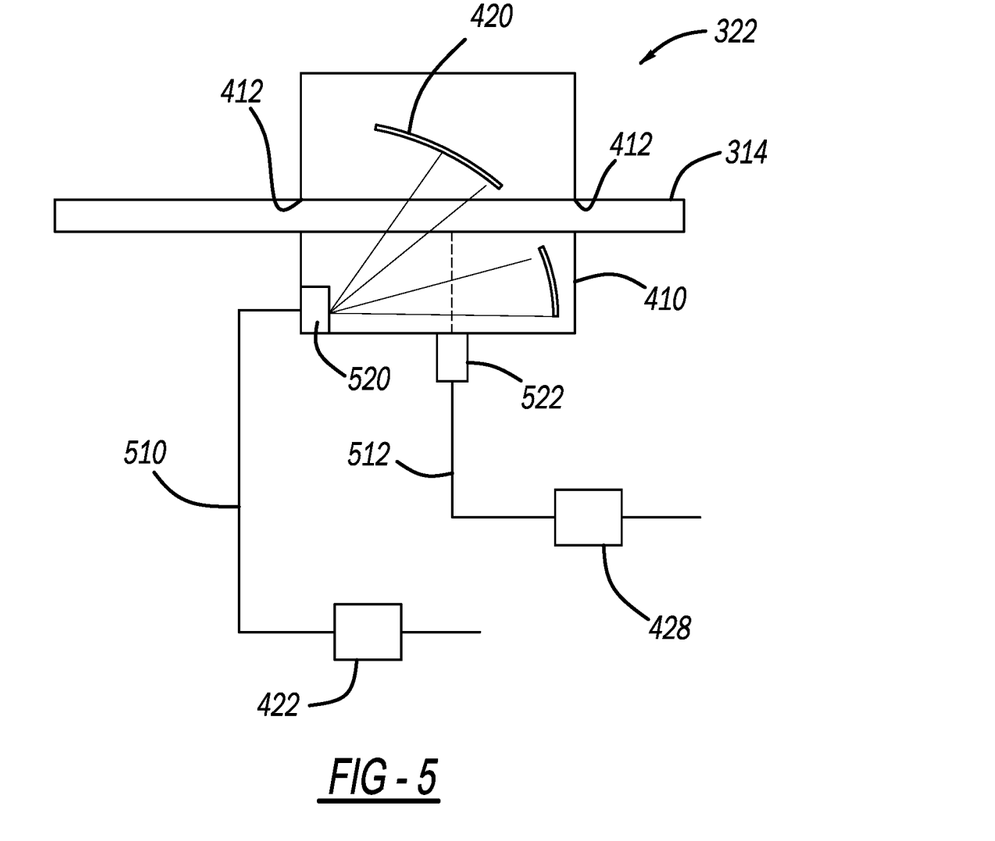
FIG. 5 is an alternative collection housing according to the present disclosure.

The photon counting detector 428 samples the pulse train at right angles and may be located distance of 1 mm to 10 mm from the laser beam. The photon counting detector 428 may be located before or after any pulse compression. The photon counting detector 428 may be silicone avalanche diode and, as illustrated in FIG. 5, may be optically coupled to or formed with a filter to collect the wavelengths associated with the laser beam. The photon counting detector 428 may also be InGaAs/InP.

Referring now to FIG. 5, one or both of the fast diode 422 or the photon counting detector 428 may be replaced with an optical fiber 510, 512 that are in optical communication with the fast photodiode 422 and the photon counting detector 428. Filters 520, 522 are other optical elements may be disposed between the housing 322 and the fast photodiode 422 and the photon counting detector 428. The optical elements 520, 522 may be band pass filters that pass only the wavelength associated with the laser. This will eliminate the corruption of the counts with the ambient conditions in and around the laser. The filters 520, 522 may be high resolution optical filters suitable for pulse characterization as described below in FIG. 10. In the example set forth in FIG. 5, the fast diode 422 and the photon counting detector 428 may thus be located outside or remotely from the housing 322.

Figure 6:
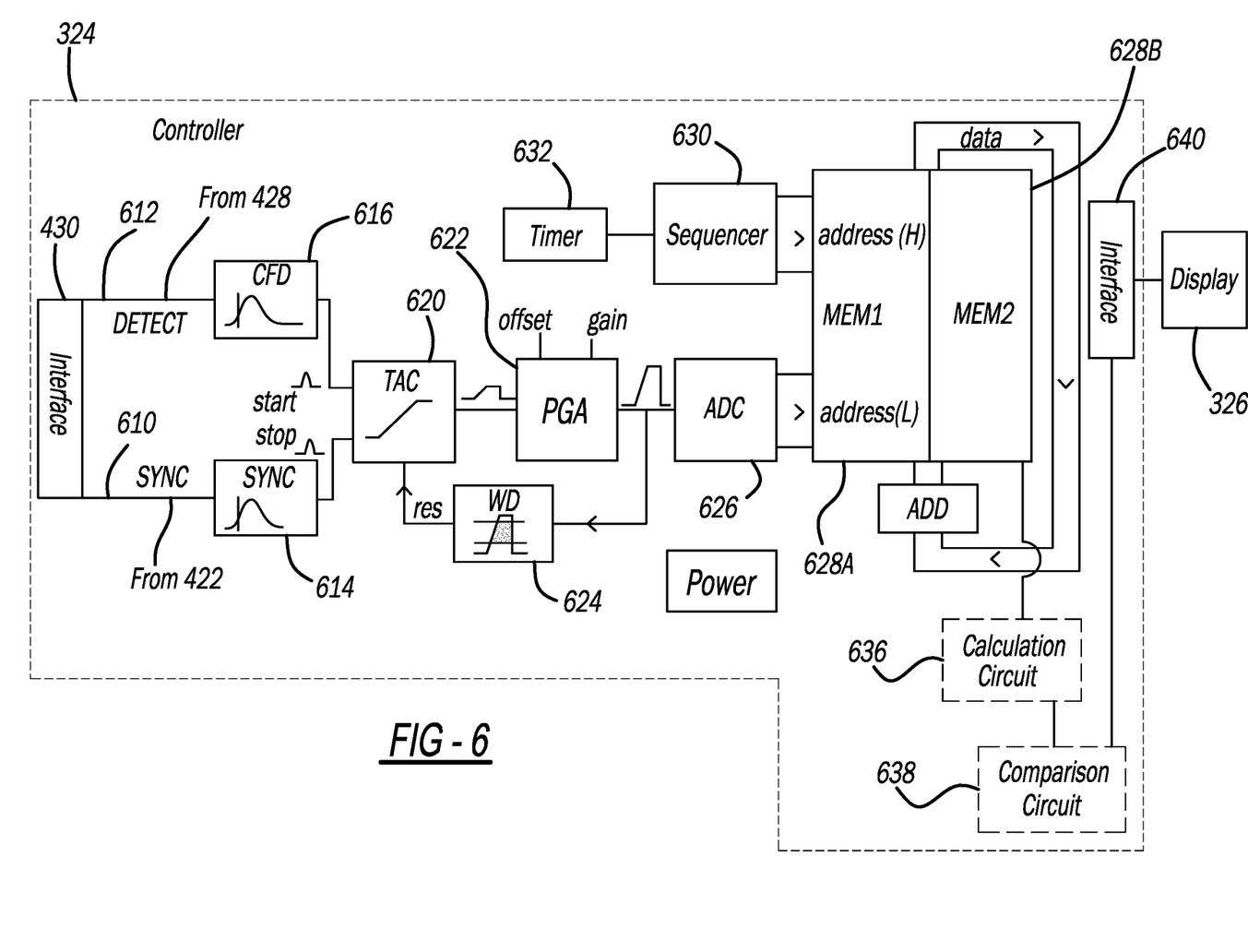
FIG. 6 is a block diagrammatic view of a time correlated single photon counting system.

Referring now to FIG. 6, the controller 324 is illustrated in further detail. The interface 430 receives signals from the fast photodiode 422 and the photon counting detector 428. That is, the interface 430 has a communication line 610 that receives a signal from the fast photodiode 422 and a second communication line 612 that receives a communication signal from the photon counting detector 428. Synchronization signals are received from the fast photodiode at a synchronization (sync) circuit 614. The signal from the photon counting detector 428 is received at a constant fraction discriminator (CFD) 616. The sync circuit may also contain a constant fraction discriminator. The fast photodiode 422 allows synchronization of the signal with the entire pulse train. By using the sync signal, the relative timing of the arrival of the photon detected by the photon counting detector 428 may be determined. The signals from the synch circuit 614 and the constant fraction discriminator 616 are communicated to the time to amplitude converter (TAC) 620. The time to amplitude converter 620 converts the signal from the CFD 616 based on the sync circuit 614. The time to amplitude converter 620 generates an output voltage that is communicated to the programmable gain amplifier 622. The programmable gain amplifier may be used to amplify the voltage signal from the time to amplitude converter 620. The gain and offset may be adjusted to provide desired results. The output of the programmable gain amplifiers communicated to the analog to digital converter 626. Also, a window discriminator 624 provides feedback to the time to amplitude converter which rejects the processing of signals outside a predetermined window.

The output of the analog to digital converter 626 corresponds to memory addresses in the memory 628A therein. The addresses correspond to time windows or bins that are associated with a time relative to the laser signal. Some bins correspond to the pulse and some bins or time windows correspond to the time between the pulses. In some implementations, the time of the second pulse including the end of the second pulse may also be incorporated into the memory. After processing and as will be described below, if two pulses with the time period in between, the values may be divided by two to provide the counts for the pulse plus the time in between the pulses. The analog to digital converter 626 converts the signal from the programmable gain amplifier into a memory address. Each memory address that is generated receives one count which corresponds to a photon. As mentioned above for a pulse and the time in between a pulse may be counted. A sequencer 630 and a timer 632 are used to sequence the address locations. Each time an address is determined by the analog to digital converter 626, the add circuit 634 increases the count within the memory. Ultimately, a histogram of counts for predetermined bins is determined at the memory 628A. A calculation circuit 636 may calculate the amount of photon counts within an entire pulse including the time in between pulses. As mentioned above, two complete pulses and the time in between the pulses may be used wherein the sum of the counts within each of the pulses is divided by two when used for the count of the entire laser signal. The amount of pulses within the pulse may be the numerator of a fraction and the overall count in the denominator. This value corresponds to the power figure of merit (PFM) as mentioned above. A comparison circuit 638 may compare the values of the power between the pulses or PFM. The comparison circuit 628 may compare the values over time that are stored in the memory 628B to a threshold. The comparison circuit 628 communicates values to the interface 640 and thus the displays 326 may generate an error signal, a control signal or the like.

Figure 7A:
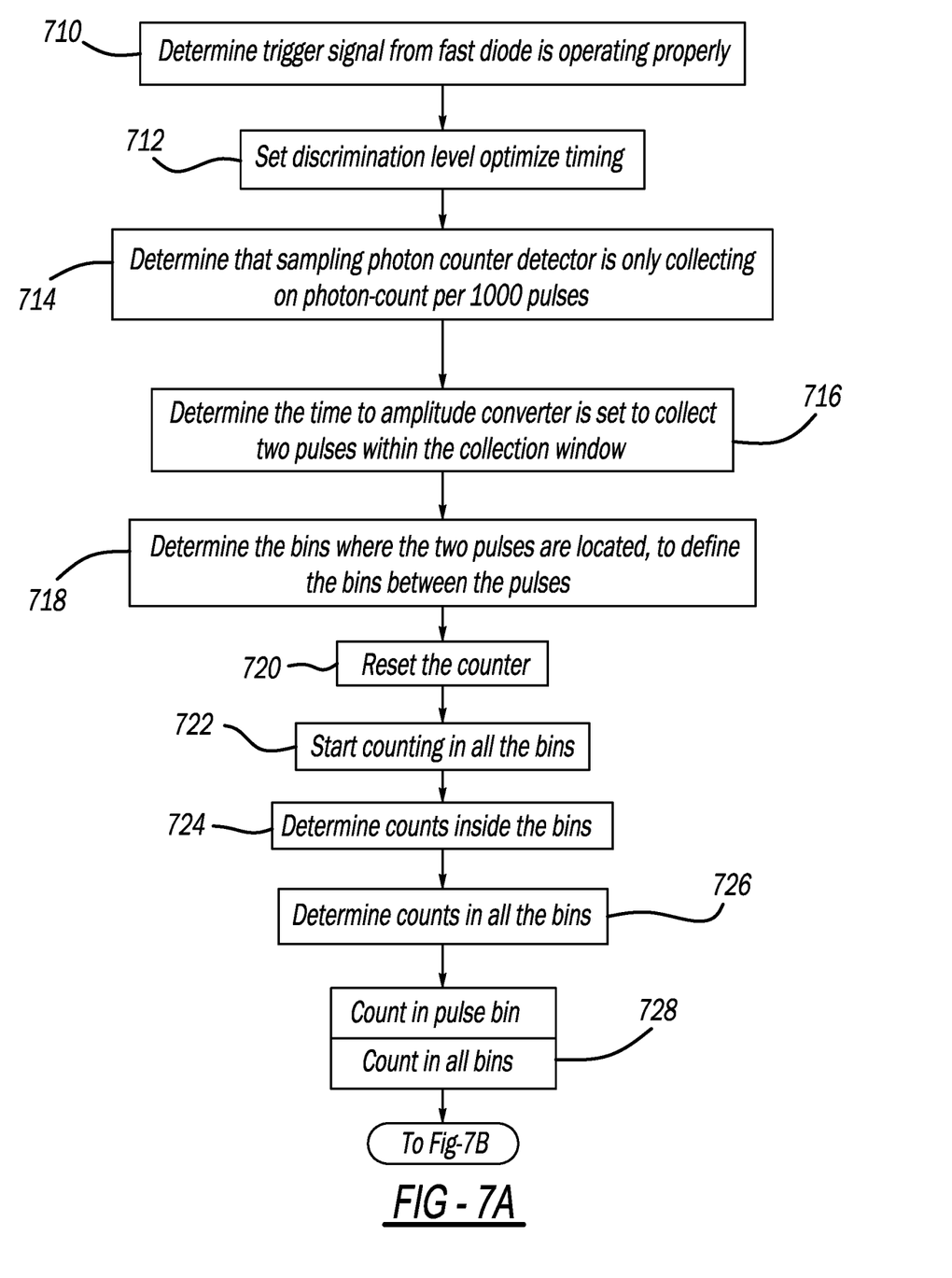
FIGS. 7A and 7B are a flowchart of a method for setting up and operating the present system.
Figure 7B:
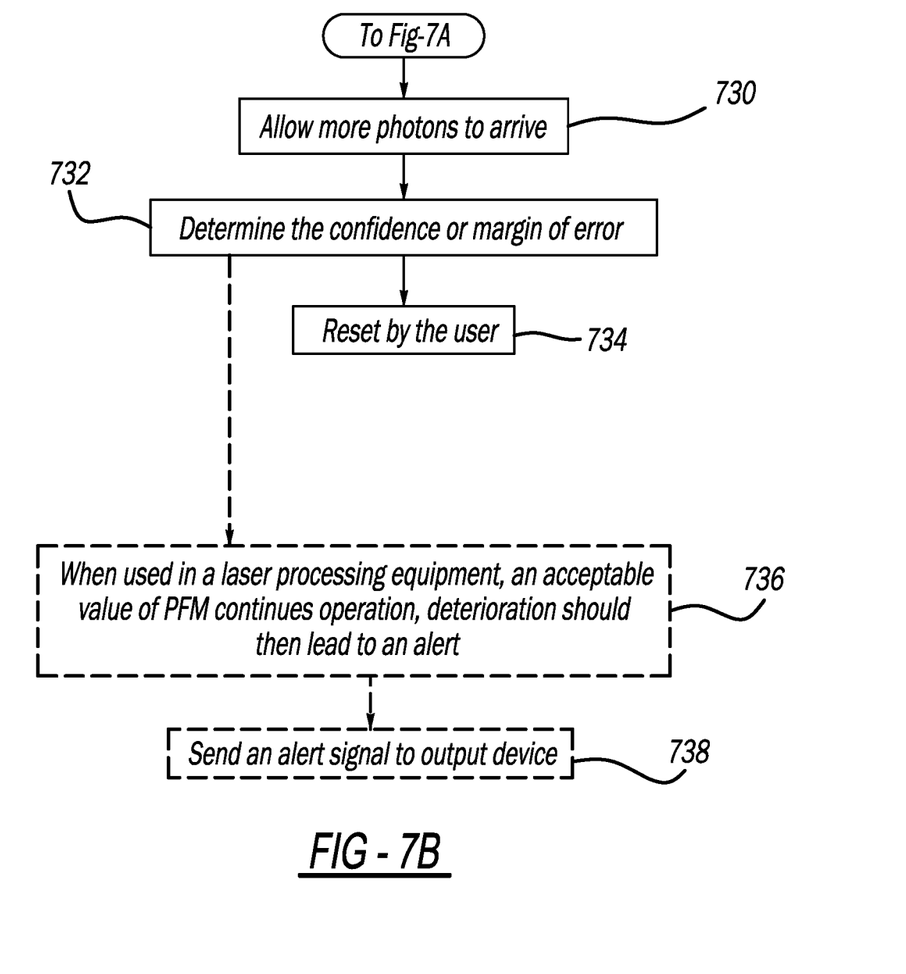

Referring now to FIGS. 7A and 7B, a method of operating the system is set forth. Prior to counting photons, various system components may be adjusted and tested for proper functioning. In step 710, a trigger signal from a fast diode is tested to determine whether it is operating properly. In step 712, the discriminator level to optimize timing is also set. In step 714, the collection of one photon count is determined for a desired amount of pulses. In this example, one photon count is collected per 1000 pulses. In step 716, the time to amplitude converter is set to collect two pulses within the collection window. That is, the time window over which photons are counted corresponds to a time long enough to encompass two laser pulses. The time to amplitude converter could also be used to collect from the rising edge of the pulse to the rising edge of the following pulse. In step 718, when the bins corresponding to the two pulses are determined, the bins in between the pulses are also determined by the relative timing. In step 720, all of the counters are reset to begin the process. In step 722, the operation of the laser and the counting process is initiated and thus the number of photon count in all the bins is increased per the above description. In step 724, the counts inside the pulse bins are determined. In step 726, the counts in all bins are determined. As the system progresses in step 728, the PFM is determined by the counts in one pulse bin divided by two which is divided by the counts in all of the bins. In step 730, the more photons that arrive, the better the results. In step 730, the amount of photon counts may increase accordingly to a predetermined adjustment period. In step 732, the confidence level or margin of error may be determined. The user then can reset the system in step 734. After step 732, step 736 may also be performed in which the laser processing equipment may generate an alert that an acceptable value of PFM has been determined. If an acceptable PFM is determined, the process may continue. An alert signal or other display may be communicated to an output device such as a screen display. Further examples were mentioned above.

Figure 8:
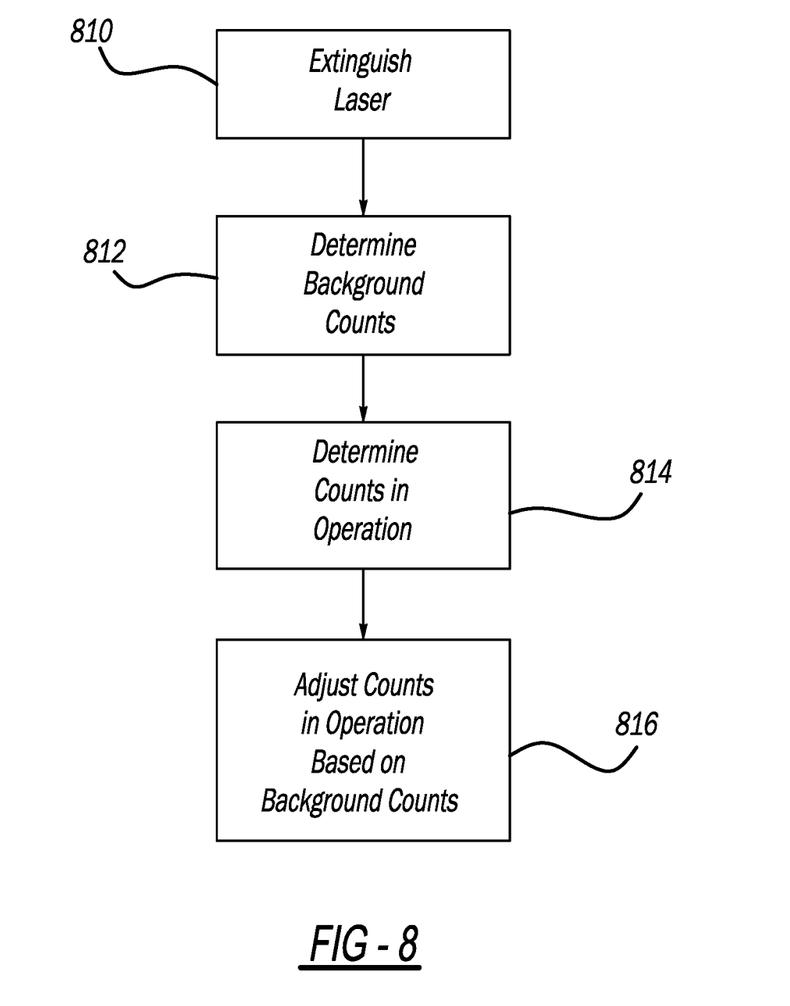
FIG. 8 is a flowchart of a method for correcting for background light.

Referring now to FIG. 8, the number of counts may need to be adjusted based upon the background of the environment in which the laser operates. In some areas of operation, the background light may increase the number of counts. Therefore, in step 810, the laser may be extinguished. When this is the case, an alternative trigger signal is provided to enable counting of background photons, because the fast photodiode 422 does not operate with the laser is extinguished. The number of background counts for the same amount of time in which the counts in FIG. 7 were determined. In step 812, the background counts are obtained when the laser is extinguished. In step 814, the counts for the various bins are determined as set forth in FIG. 7. Step 814 may be performed after steps 810 and 812 or before steps 810 and 812. In step 816, the counts in operation may be adjusted based upon the background counts. That is, the background counts may be subtracted from the counts in operation to form an adjusted amount of counts.

In step 736, the determination of whether a PFM is acceptable may be determined by a PFM being within an acceptable window or crossing a threshold.

Figure 9A:
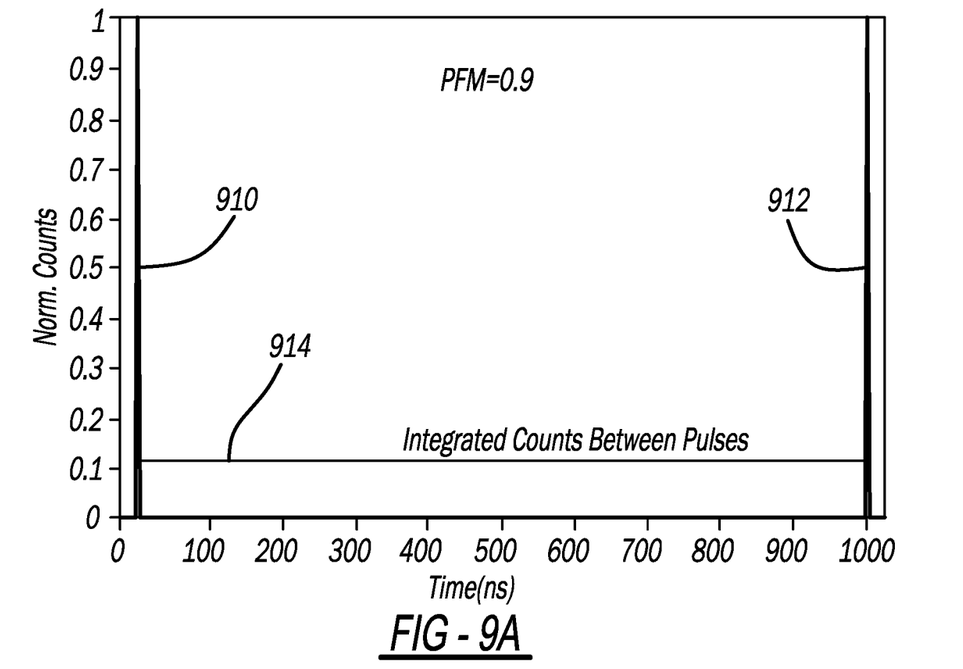
FIG. 9A is a plot of normalize counts versus time for a 100 watt laser with power figure of merit of 0.9.

Referring now to FIG. 9A, the number of counts versus time in nanoseconds is set forth. Two pulses 910 and 912 are illustrated. The integrated number of counts 914 is at about 0.1 of the arbitrary number of counts. Therefore, the PFM is 0.9 in FIG. 9A. As mentioned above, the accuracy may be increased when a longer acquisition time is used. However, the values that correspond to counts must not exceed the counters that are present. In this example, $10^3$ photons were counted. The results in FIG. 9A are using the output of 100 watt laser with a PFM of 0.9 with the vertical axis being normalized to the counts. Because the PFM is 0.9, this means that the amount of energy between the pulses is about 10% of the total energy. That is, the integrated counts indicate about 10 watts of power between the counts.

Figure 9B:
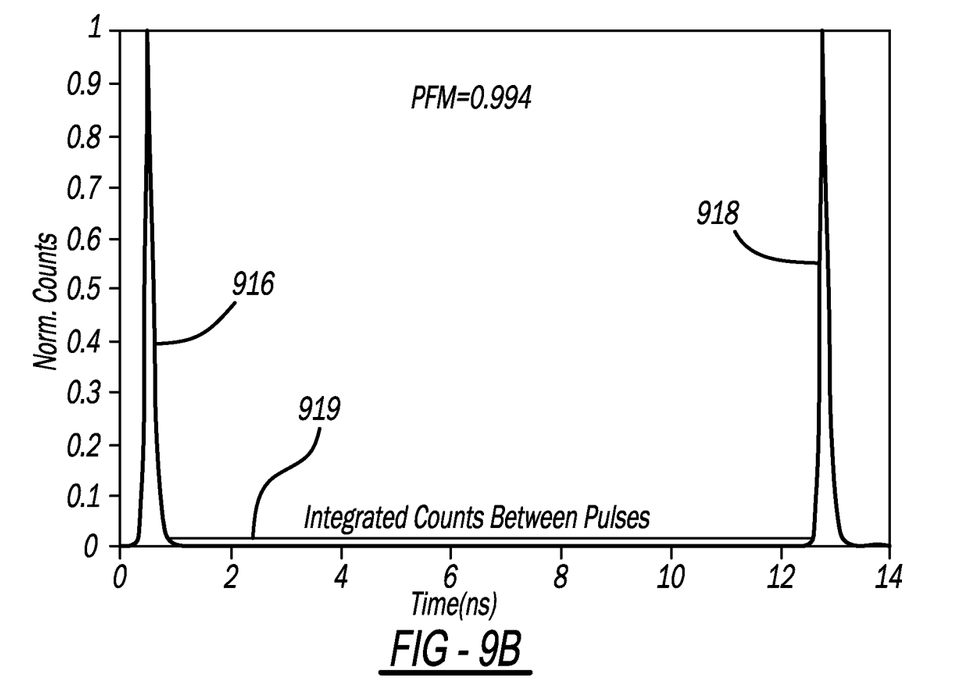
FIG. 9B is a plot of normalize counts versus time for a power figure of merit of 0.0094 of a titanium sapphire femtosecond laser.

Referring now to FIG. 9B, a power figure of merit measurement of 0.994 was obtained in the plot using a titanium sapphire femtosecond laser oscillator with an 80 MHz repetition rate. As is illustrated, the pulses 916 and 918 are wider than the counts from FIG. 9A due to the type of laser. The integrated counts 919 are very low so a high PFM of 0.994 is obtained.

Figure 9C:
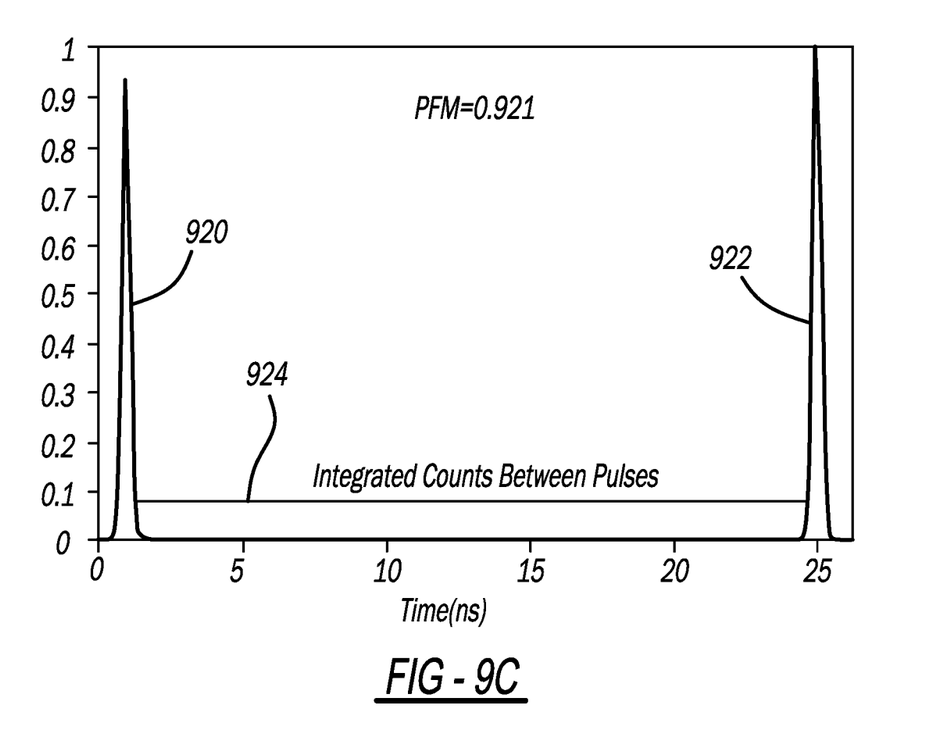
FIG. 9C is a plot of second harmonic counts versus time for a Yb-doped fiber femtosecond laser oscillator with a 41.5 MHz repetition rate.

Referring now to FIG. 9C, two pulses 920 and 922 are provided with an integrated count 924 between the pulses. FIG. 9C represents a measurement obtained following detection of the second order harmonic wavelength from a Yb-doped fiber femtosecond laser oscillator with a 45.5 MHz repetition rate. It has been discovered that some useful results may be obtained using a second order harmonic. The second order harmonic may be used together with the first order harmonic to obtain alternate results to that set forth in FIG. 9A. Thus, first order harmonics, second order harmonics or a combination of first and second harmonics may be used to generate the counts.

The principle for measuring the Power Figure of Merit within the present laser apparatus and method includes the use of a photon counter capable of measuring individual photons that are sampled from the IUSPL, and to count them in separate bins according to their time of arrival. The present apparatus and method's use of this linear statistical photon sampling process is novel because pulse characterization typically involves a nonlinear optical process (for example, second harmonic generation), which would be relatively blind to photons outside the main pulses. By binning the photon counts between two pulses, the measurement disclosed gains 7-orders of magnitude of accuracy, limited only by dark counts (noise counts generated by the photon counter in the absence of photons) on the single photon detector which are typically <100 per second. The number of dark counts can be measured and subtracted from measurements in order to obtain more accurate values. The accuracy of the measurement improves with averaging time.

So, while conventional methods would have difficulty measuring a PFM of 0.5 and may not be able to measure higher PFM values, the measurement disclosed may easily quantify a PFM number up to 0.999.

Figure 10:
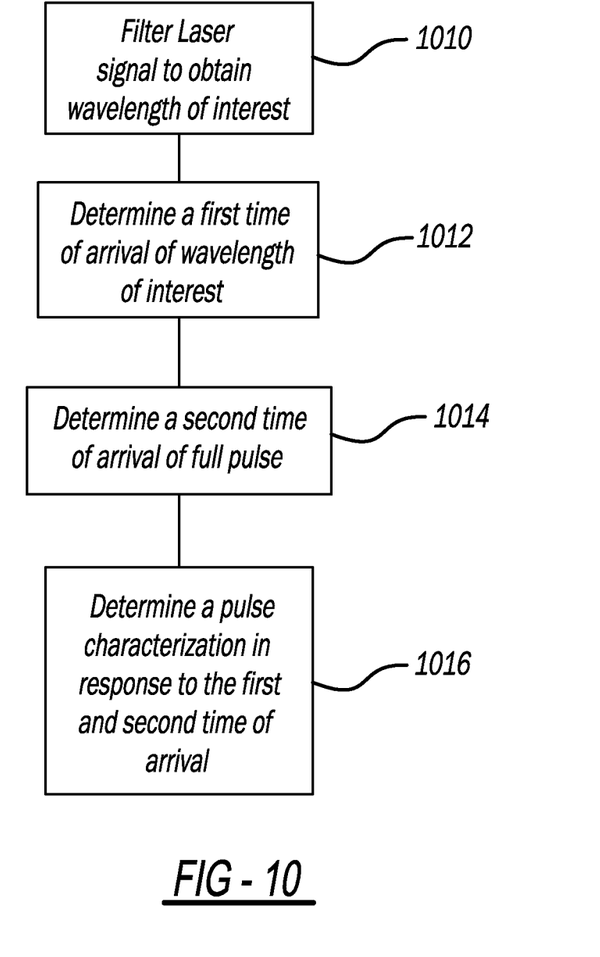
FIG. 10 is a flowchart of a method for characterizing a laser pulse.

FIG. 10 illustrates a method for characterizing the pulse of the laser. In FIG. 10 the laser signal is filter to obtain a wavelength of interest. The filter may be a high-resolution optical filter. In step 1012, a first time of arrival of the first wavelength of interest is obtained. In step 1014 a second time of arrival of the full pulse is determined. In step 1016 a pulse characterization in response to the first time of arrival and the second time of arrival is obtained. This process may be repeated for various wavelengths over the course of the laser. The pulse characterization together with the counts generated above may allow a system operator to have a more complete understanding of the characteristics of the laser operation. The pulse characterization may be a temporal shape of a laser pulse. The photon counting detector 428 receives both the wavelength selected photon and a photon from the pulse. The time between these two pulses is then sampled over all wavelengths in the pulse (selectively filtered by the filter) to obtain the temporal shape of the pulse. The temporal shape is the arrival time of different wavelengths of the pulse. The shortest pulse is when all wavelengths arrive at the same time.

The present photon counting approach has two key advantages. First, it has an unlimited dynamic range that is only limited by the time of acquisition. Second, it permits flexibility in the choice of time windows, or bins, where the photons are accumulated. For example, one bin can be 100 ps in duration, to encompass the pulse, while the next bin can be as wide as the time to the next pulse. Thus, the number of photons within the first 100 ps, divided by the number of photons integrated until the next pulse, would correspond closely with the PFM. Binning flexibility can allow the user to look for the presence of pre- and post-pulses that are nanoseconds away from the main pulse. These pulses would be able to diagnose the presence of faulty pulse pickers and other devices being used to control the repetition rate of the laser.

While various features of the present disclosure have been disclosed, it should be appreciated that other variations can be employed. For example, other types of lasers or optics to sample the laser may be used although certain benefits may not be achieved. It should be appreciated that features of one example may be interchanged with features of another example in any combination and order, and the claims may be multiply dependent upon each other and in any combination. Variations are not to be regarded as a departure from the present disclosure and all such modifications are intended to fall within the scope and spirit of the present disclosure.

What is claimed is:

1. A system for determining a characteristic of a laser comprising:
   a collection housing receiving a laser beam comprising a first pulse, a second pulse and a time period between the first pulse and the second pulse;
   a photon counting detector receiving photons from the laser beam disposed to generate photon signals from the laser beam, generating a start signal;
   a diode generating a stop signal to provide a time reference of counted photons; and
   a controller coupled to the photon counting detector and the diode, the controller counting photons from the photon counting detector occurring during the time period between the first pulse and second pulse based on the time reference and generating a first output signal corresponding to a pulse power during the time period between the first pulse and the second pulse.

2. The system of claim 1 wherein the collection housing comprises a mirror having an opening therethrough, the opening receiving the laser beam.

3. The system of claim 2 wherein the mirror comprises a paraboloid mirror.

4. The system of claim 2 wherein the opening is coupled to a slot disposed in the collection housing and in the mirror, the slot cooperating with the opening.

5. The system of claim 1 wherein the photon counting detector counts photons within a plurality of time windows collectively forming the time period.

6. The system of claim 5 wherein the controller sums the photons in each of the plurality of time windows of the time period.

7. The system of claim 1 wherein the photon counting detector and the diode are coupled to the collection housing with optical fibers.

8. The system of claim 1 wherein the photon counting detector and the diode are coupled to the collection housing with respective optical fibers though respective optical filters.

9. The system of claim 1 wherein the controller measures an overall pulse power for the first pulse and the time period.

10. The system of claim 9 wherein the controller measures an overall pulse power based on photons within the first pulse, the second pulse and the time period.

11. The system of claim 9 wherein the controller generates a pulse power figure of merit using the pulse power between the first pulse and the second pulse and the overall pulse power.

12. The system of claim 1 further comprising a display, the display displaying an indicator corresponding to the pulse power during the time period between the first pulse and the second pulse.

13. The system of claim 1 wherein the pulse power during the time period between the first pulse and the second pulse corresponds to a number of photons.

14. The system of claim 1 wherein the controller compares the first output signal to a threshold and generates a screen display in response to the comparison.

15. The system of claim 1 wherein the controller generates a statistical representation of photon signals of the laser beam.

16. The system of claim 1 wherein a diode output signal depends nonlinearly on a laser pulse intensity, and wherein the diode output signal provides data proportional to a duration of the first pulse and second pulse.

17. The system of claim 1 further comprising generating a pulse characterization of the laser from a first time of arrival of a first wavelength of light and a second time of arrival of a full pulse based on the time reference.

18. The system of claim 17 wherein the pulse characterization comprises a temporal shape of the full pulse.

19. A system for determining a characteristic of a laser system comprising:
a collection housing receiving a laser beam comprising a first pulse, a second pulse and a time period between the first pulse and the second pulse;
a photon counting detector receiving photons from the laser beam disposed to generate photon signals from the laser beam;
a photodiode generating a stop signal to provide a time reference of counted photons; and
a controller comprising a time correlated single photon counter counting photons from the photon counting detector occurring during the first pulse to get a first count and the time period between the first pulse and second pulse to get a second count based on the time reference, the controller generating a first output signal corresponding to the first count and the second count indicative of a performance of the laser system.

20. The system of claim 19 wherein the first output signal comprises the first count divided by a sum of the first count and the second count.

21. The system of claim 20 wherein the first output signal corresponds to a power figure of merit.

22. The system of claim 19 wherein the collection housing comprises a mirror having an opening therethrough, the opening receiving the laser beam.

23. The system of claim 20 wherein the mirror comprises a paraboloid mirror.

24. The system of claim 22 wherein the opening is coupled to a slot disposed in the housing and in the mirror, the slot cooperating with the opening.

25. The system of claim 19 wherein the controller generates a statistical representation of photon signals of the laser beam.

26. The system of claim 19 wherein a photodiode output signal depends nonlinearly on a laser pulse intensity, and wherein the photodiode output signal provides data proportional to a duration of the first pulse and second pulse.

27. The system of claim 19 further comprising generating a pulse characterization of the laser from a first time of arrival of a first wavelength of light and a second time of arrival of a full pulse based on the time reference.

28. The system of claim 27 wherein the pulse characterization comprises a temporal shape of the full pulse.

29. A method comprising;
generating a first count of photons at a time period between consecutive laser beam pulses;
comparing the first count to a threshold; and
generating a degradation indicator signal in response to comparing the count.

30. The method of claim 29 wherein generating a degradation indicator comprises generating the degradation indicator when the first count is above the threshold.

31. The method of claim 29 further comprising generating a second count for photons within a first laser beam pulse and summing the first count and second count to obtain a count total, and generating a power figure of merit using the second count and the count total.

32. The method of claim 31 further comprising generating the first count and the second count using a time correlated single photon counting system.

33. The method of claim 29 further comprising generating a third count corresponding to photons in a second laser beam pulse and wherein a total count comprises a sum of the first count and the second count divided by two.

34. The method of claim 29 wherein a diode output signal depends nonlinearly on a laser pulse intensity, and wherein the diode output signal provides data proportional to a duration of the first pulse and second pulse.

35. The method of claim 29 generating a pulse characterization of the laser from a first time of arrival of a first wavelength of light and a second time of arrival of a full pulse based on the time reference.

* * * * *